United States Patent
Fainberg

(10) Patent No.: US 11,411,822 B2
(45) Date of Patent: Aug. 9, 2022

(54) SEGMENTATION MANAGEMENT INCLUDING TRANSLATION

(71) Applicant: FORESCOUT TECHNOLOGIES, INC., San Jose, CA (US)

(72) Inventor: Ilya Fainberg, Tel Aviv (IL)

(73) Assignee: Forescout Technologies, Inc., San Jose, CA (US)

(*) Notice: Subject to any disclaimer, the term of this patent is extended or adjusted under 35 U.S.C. 154(b) by 19 days.

(21) Appl. No.: 16/144,130

(22) Filed: Sep. 27, 2018

(65) Prior Publication Data
US 2020/0007397 A1    Jan. 2, 2020

Related U.S. Application Data

(63) Continuation-in-part of application No. 16/023,284, filed on Jun. 29, 2018.

(51) Int. Cl.
H04L 12/24 (2006.01)
H04L 29/06 (2006.01)
H04L 12/26 (2006.01)
H04L 41/0893 (2022.01)
H04L 41/14 (2022.01)
(Continued)

(52) U.S. Cl.
CPC ...... H04L 41/0893 (2013.01); H04L 41/0213 (2013.01); H04L 41/0226 (2013.01); H04L 41/145 (2013.01); H04L 43/045 (2013.01); H04L 63/0263 (2013.01); H04L 63/101 (2013.01); H04L 63/104 (2013.01); H04L 63/20 (2013.01); H04L 63/1425 (2013.01)

(58) Field of Classification Search
CPC ............ H04L 41/0893; H04L 41/0213; H04L 41/0226; H04L 41/145; H04L 43/045; H04L 63/0263; H04L 63/101; H04L 63/104; H04L 63/20; H04L 63/1425
See application file for complete search history.

(56) References Cited

U.S. PATENT DOCUMENTS 8,341,717 B1    12/2012 Delker et al.
2007/0157286 A1*  7/2007 Singh .................. H04L 41/0893
726/1
(Continued)

OTHER PUBLICATIONS

International Search report for the International Application No. PCT/US2019/052017, dated Nov. 12, 2019.
(Continued)

*Primary Examiner* — Abdulkader M Alriyashi
(74) *Attorney, Agent, or Firm* — Womble Bond Dickinson (US) LLP

(57) ABSTRACT

Systems, methods, and related technologies for segmentation management are described. The segmentation management may include visualization, configuration including translation, simulation, or a combination thereof of one or more segmentation policies. In certain aspects, a segmentation policy is accessed and a segmentation rule is determined based on the segmentation policy. An enforcement point associated with the segmentation rule may be determined, where the enforcement point is communicatively coupled to a network. The segmentation rule may be translated into a configuration associated with the enforcement point and the configuration communicated to the enforcement point.

17 Claims, 7 Drawing Sheets

Fig. 4

(51) Int. Cl.
*H04L 9/40* (2022.01)
*H04L 41/0213* (2022.01)
*H04L 41/0226* (2022.01)
*H04L 43/045* (2022.01)

(56) References Cited

U.S. PATENT DOCUMENTS

| | | | | |
|---|---|---|---|---|
| 2009/0288135 | A1* | 11/2009 | Chang | H04L 63/20 |
| | | | | 726/1 |
| 2010/0050229 | A1* | 2/2010 | Overby, Jr. | H04L 63/20 |
| | | | | 726/1 |
| 2013/0275574 | A1* | 10/2013 | Hugard, IV | H04L 41/12 |
| | | | | 709/224 |
| 2014/0130119 | A1* | 5/2014 | Goldschlag | H04L 63/20 |
| | | | | 726/1 |
| 2015/0326528 | A1 | 11/2015 | Murthy et al. | |
| 2016/0294691 | A1* | 10/2016 | Joshi | H04L 41/0893 |
| 2016/0301717 | A1 | 10/2016 | Dotan et al. | |
| 2016/0359673 | A1* | 12/2016 | Gupta | G06F 3/04842 |
| 2016/0359912 | A1* | 12/2016 | Gupta | H04L 43/0888 |
| 2017/0118173 | A1 | 4/2017 | Arramreddy et al. | |
| 2018/0159751 | A1 | 6/2018 | Zhang et al. | |
| 2018/0176185 | A1 | 6/2018 | Kumar et al. | |
| 2018/0337858 | A1* | 11/2018 | Yang | H04L 63/20 |

OTHER PUBLICATIONS

International Search report for the International Application No. PCT/US2019/052018, dated Nov. 12, 2019.
International Search Report and Written Opinion for International Application No. PCT/US2019/036106, dated Sep. 8, 2019.
International Preliminary Report on Patentability dated Jan. 7, 2021, for International Application No. PCT/US2019/036106, filed Jun. 7, 2019, pp. 8.
International Preliminary Report on Patentability dated Apr. 8, 2021, for International Application No. PCT/US2019/052018, filed Sep. 7, 2019, pp. 8.
International Preliminary Report on Patentability dated Apr. 8, 2021, for International Application No. PCT/US2019/052017, filed Sep. 19, 2019, pp. 8.

\* cited by examiner

SEGMENTATION MANAGEMENT INCLUDING TRANSLATION

CROSS-REFERENCE TO RELATED APPLICATIONS

This application is a continuation in part of U.S. patent application Ser. No. 16/023,284, and entitled "DYNAMIC SEGMENTATION MANAGEMENT," with filing date Jun. 29, 2018, and is hereby incorporated by reference in its entirety.

This application is related to U.S. patent application Ser. No. 16/144,051, and entitled "SEGMENTATION MANAGEMENT INCLUDING VISUALIZATION, CONFIGURATION, SIMULATION, OR A COMBINATION THEREOF," with filing date Sep. 27, 2018, and is hereby incorporated by reference in its entirety.

TECHNICAL FIELD

Aspects and implementations of the present disclosure relate to network segmentation, and more specifically, configuration of enforcement points based on a segmentation policy.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
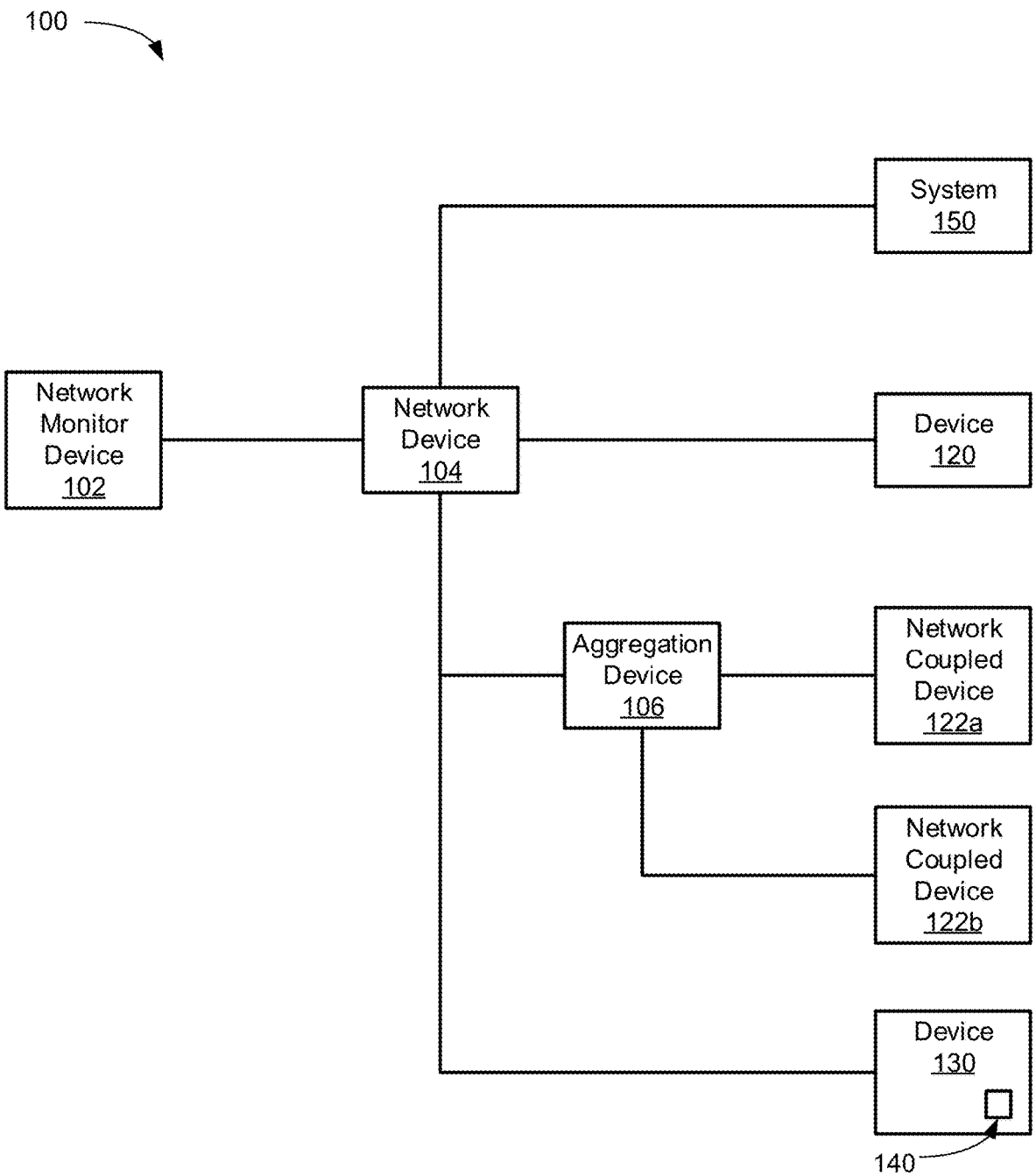
FIG. 1 depicts an illustrative communication network in accordance with one implementation of the present disclosure.

Aspects and implementations of the present disclosure are directed to segmentation management including translation. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that network security is maintained. Accordingly, described herein in various implementations are systems, methods, techniques, and related technologies, which allows segmentation configuration including translation of configuration information (e.g., configuration commands) to enable a segmentation policy to be determined and then seamlessly configured on one or more enforcement points.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the traffic flowing between the devices.

Historically, networks were planned and architected in a static manner, meaning each type of user, device, or application on the network has its own range of IP addresses. In addition, networks were historically flat due to ongoing connectivity of users and that made segmentation a very hard project to execute. Even when subnets were used, the IP addresses and roles were statically mapped (e.g., 10.10.10.0/24 mapped to servers). This methodology served network engineers well for the last 20 years. Traditionally networks were segmented or built statically and hierarchically and static segmentation tools were used. Each environment or subnet on the network would have its own functionality. In other words, the segment that a device is part of is based on the IP address of the device. Segmentation done on an IP address basis is fixed or static in manner and is based on more traditional network topologies or organization of devices. Based on the functionality of that static segment, there would be defined segmentation rules that are usually done with static access control lists (ACLs) on routers or firewalls. There is little to no opportunity to be dynamic with the segmentation under such as static policy.

The efficiency and functionality of this model has been challenged in the past several years by the trends of bring your own device (BYOD), internet of things (IoT), virtualization, and elasticity. Further, the mobility of users and devices presents a major challenge for corporate networks to provide efficiency and functionality while being secure. Traditional segmentation methodologies are not well suited for the elasticity in the number of devices and types of devices.

With BYOD, a user is allowed to bring his or her own device onto a network (e.g., a corporate network), and with IoT, the number and type of devices on a corporate network, which used to be predictable and contained, is now unpredictable and exponentially growing. BYOD results in a highly dynamic number of devices. IoT has led to a dramatic rise in the number of devices as well as the variety of devices. The rapid increase in IoT devices is growing and segmentation is one of the most efficient ways to contain the threat of a compromise of IoT devices and reduce the attack surface around IoT devices. Pre-defined IP ranges can no longer accommodate the needs, as in most cases there is no way to accurately predicted the number of devices of each type that will appear on the network. In addition, it is very hard to segment an existing flat network from scratch as such a procedure can be disruptive to an organization.

With virtualization and the large increase in elasticity, entities or systems on the network are no longer static physical boxes that sit in the data center or other locations. Desktops and servers are increasingly shifting to a virtual, dynamic, and completely elastic model. This means that it is very difficult to determine an application, device type, or user from its IP address because a virtual server or desktop can appear in two different continents within a day with different IP addresses (while being seamless to an end user).

For example, a zone with a development server may need to be accessible by a group of research and development (R&D) users. The rapid increase in the number of devices and types of devices causes the defining of the large zone of characteristic functionality to no longer scale. Smaller zones could be used but then the network would be more flat and less structured with specific subnets. This becomes particularly problematic when internet protocol version 4 (IPv4) is used because as the number of devices increases the number of available addresses quickly runs out. The more IPv4 devices you have, the more IPv6, which has a larger address space, is needed, and IPv6 has its own implementation challenges.

Segmentation is often done by applying a tag to a device based on the IP scheme. The determination and application of tags to devices is manual. The manual nature of the tagging limits the effectiveness of the segmentation and in some cases even the viability of a segmentation project. For example, a segmentation scheme may indicate that devices in a 10.10.10.x subnet are application servers and thus each server with an IP address in the 10.10.10.x subnet is assigned an application tag. The tags are thus statically mapped to a device based on IP address.

If a device is assigned a tag based solely on the IP address and if the IP address does not match the segmentation scheme, then a device may be tagged with a tag that does not properly match the segmentation scheme. For example, if a printer gets an IP address that is associated with an IP camera segment, then the printer may be restricted from operating properly by being prevented from communicating with devices such as laptops and desktops.

Security products intended to keep networks safe and secure can no longer rely on static IP address schemes as in the last 20 years. Decisions and actions stemming from these products are gradually becoming irrelevant and misleading. Thus, what is needed are granular, adaptive, and flexible solutions that are agnostic to the IP addressing scheme.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically segment various entities, as described herein.

Using current segmentation products in the market results in a segmentation policy that is usually flat which results in large and cumbersome rulesets with various rules and exceptions that need to be manually micromanaged by multiple users (e.g., multiple engineers) or by third party software. In addition, due to the structure of the existing segmentation policy, which is usually a long list of table form rules, it is very difficult to properly figure out the end result upon evaluation of the whole segmentation policy evaluation.

In other words, given a large number of rules with a wide variety of rules, it can be difficult to determine a result of the application of the large number of rules. The rules are typically created for each and every entity which can be a subnet or an IP. For example, with rules spread across two different firewalls, it can be difficult to understand how the rules of one firewall will interact with the rules of the other firewall. The defining of rules that are consistent across different enforcement points that work consistently with the segmentation policy can thus be quite challenging.

Precedence is important because one rule can override another rule. Segmentation rule precedence is determined by the order of the rules, which further complicates the management of the segmentation policies. For example, with a result of thousands of rules, it can quickly become challenging to determine how the rules apply and if the rules are designed as intended and ordered as intended. The difficulty in knowing the result of evaluating the rules means that it can be difficult to know if two devices are able to communicate, which means allowed communications could be blocked and unwanted communications could be allowed.

A segmentation policy, in accordance with embodiments, can include a variety of rules for a variety of entities (e.g., users, devices, locations, etc.). The rules can be applied or configured on one or more enforcement points (e.g., a switch, firewall, virtual network infrastructure, cloud infrastructure, etc.).

Often a segmentation project involves a hardware refresh and a network re-architecture in order to meet the basic segmentation technology requirements. The process usually causes disruption to the business and the project lags behind as business continuity comes before security, meaning that an organization is massively investing in technology but eventually remains under segmented and thus possibly insecure. Segmentation project leaders should be able to plan the project based on the needs and the existing segmentation tools instead of having to buy new and expensive technology and having to plan the segmentation project around the segmentation technology.

Typically, organizations address segmentation projects as point solutions, covering specific environments to address specific risk types. This in turn causes segmentation policy sprawl which involves managing various segmentation technologies across different environments with little consistency across the enterprise. The segmentation platforms are like silos where on a typical network there may be firewalls from two or more vendors and in the data center and cloud there are micro segmentation products. On campuses, generic ACL based solutions may be found. Each of those are usually managed and maintained by different people through different consoles. Separate and different consoles or systems with different training requirements are not cost effective.

Planning a segmentation project using current methodologies across various types of devices and users is a complicated task with no easy way to ensure that every seen and unseen flow of traffic traversing the network should or should not be whitelisted. This means it is very hard for an organization to determine the proper segmentation policy across each type of devices, users, and services.

Embodiments enable visualization and modeling or simulation of network traffic based on granular characteristics (e.g., user role, application role, device classification, location, compliance, risk, etc.) and on different portions of the networks (e.g., campus, OT, data center, and cloud). In some embodiments, simulation of network segmentation policies is used to help users shift to a more segmented network with confidence (of minimal to no negative impact or disruptions to business continuity). Possible problems in simulated network segmentation policies may be indicated through violations of simulated segmentation policies or rules.

Orchestration and automation of network segmentation enforcement is supported. The orchestration of network segmentation can be carried out through multiple dynamic enforcement methods supported from a single homogenous segmentation policy regardless of the vendor, the operating system (OS), and the segmentation technology. The single homogenous segmentation policy can be translated for configuration of end points, as described herein. Embodiments may thus act as an abstraction layer or translation layer to allow for a segmentation policy to be designed and configured independently of the underlying enforcement points and network details. This simplifies the process of designing a segmentation policy. Upon receiving one or more implementation commands, the segmentation policy is translated into customized configurations for each enforcement point and communicated to the enforcement points thereby simplifying implementation of the segmentation policy.

In some embodiments, a simulation component allows collecting (and storing) a set of traffic and whitelisting or blacklisting particular traffic thereby allowing analysis of deviations of network traffic if network segmentation were applied. The network segmentation policy simulation could be run multiple times over a period of weeks or months to allow thorough checking of a proposed network segmentation policy. This can allow an administrator to test network segmentation policies over a long period of time to validate the proposed policy and ensure that upon implementation there will be minimal disruption.

The simulated segmentation policy may be abstracted or translated from the enforcement tools or segmentation technologies that are being used. Embodiments are able to simulate segmentation polices versus network traffic in a manner agnostic to the segmentation technology being used. Whether the network environment has enforcement points that include firewalls, switches, virtual enforcement points (e.g., NSX from VMware™), such details may be hidden from a user allowing the user to focus on determining a segmentation policy which defines which traffic is allowed and which traffic is not allowed. The network traffic can then be analyzed against the generic segmentation policy. In other words, the simulations are run in agnostic manner to the underlying enforcement point technology.

For example, embodiments may gather network traffic, present a generic segmentation policy (e.g., based on a file, for instance a template, the network traffic, or a combination thereof), and simulate or analyze the network traffic based on the segmentation policy. Embodiments may then present (e.g., display) violations of the segmentation policy based on network traffic. The segmentation policy may then be adjusted, e.g., based on review of the violations and associated network traffic, to allow desired network traffic under the segmentation policy. The segmentation policy may also be modified to block anomalous network traffic (e.g., that is determined to be anomalous as compared to prior network traffic).

The simulation of the segmentation policy may be run over a period to time (e.g., one or more months) to allow for gradually moving to enforcement (e.g., configuration of enforcement points based on the segmentation policy). The running of the simulation of a period of time allows for adjustment of the segmentation policy to operate smoothly with the baseline of network traffic (e.g., as determined from prior network traffic and a mapping of source and destination entities, as described herein).

Embodiments are thus able to allow configuration of a segmentation policy that is independent of the vendor and technology of the enforcement points of a network. Embodiments are able to allow configuration of a segmentation policy in a manner agnostic to the underlying technology. In other works, the policies and simulations are abstracted from the underlying technology of the network. Embodiments are able to receive decisions or intent of the segmentation policy and then translate the segmentation policy for implementation on the enforcement points of the network.

In some embodiments, network traffic gathered and analyzed to determine a connectivity map based on the sources and destinations of the traffic, allowing the designing of a segmentation policy without concern for the underlying enforcement technology for the segmentation policy or the underlying network equipment that the traffic is collected from. A single dashboard may thus be used to manage a segmentation policy while allowing monitoring of network traffic to determine if the segmentation policy should be updated in light of network traffic. Once input has been received to implement the segmentation policy the policy can be translated and configured across the network. In some embodiments, the generic segmentation policy is based on translated configuration from one or more enforcement points, as described herein.

For example, from a single segmentation policy, console, and dashboard, a segmentation policy can be configured and pushed to virtual enforcement points (e.g., NSX) in a data center and to enforcement points (e.g., firewalls) in a branch office. The segmentation policy can thus be configured based on actual network traffic from the network and a single connectivity map determined based on the network traffic. In some embodiments, a separate translation for various environments, e.g., data center, campus, cloud, are not needed from the perspective of segmentation policy design as a single policy from a visualization and control perspective are presented.

In various embodiments, a management plane handles the configuration of the segmentation policy which is agnostic of a control plane that implements segmentation polices across one or more enforcement points (e.g., based on translation of the segmentation policy for each enforcement point).

Embodiments may further include a controller (e.g., software defined controller) for orchestration and automation of segmentation in a heterogeneous environment, with multiple segmentation technologies across campus, data center, OT, and cloud. The controller is able to push a segmentation policy customized or translated for the each enforcement point on the network. For example, a single policy may allow devices in group A to communicate with devices in group B on port 80. This policy can be enforced in different ways based on the enforcement points of the network. For example, an ACL of a switch may be configured, a set command sent to configure a firewall, and a virtual network group set for a virtual environment. The concatenation of the string of specific actions drives the segmentation policy to be implemented across the network. The policy may have different enforcement actions when implemented on various enforcement points but is a single policy (e.g., as far as the user is concerned). Embodiments thus simplify implementation with a single segmentation policy instead of segmentation policies for each environment or enforcement point technology (e.g., a firewall policy, a NSX policy, an Amazon web services (AWS™) policy, an Azure™ policy, an ACL switch policy, etc.). Embodiments are thus able to manage segmentation across a variety of enforcement points through translation of the segmentation policy to particular enforcement points. Embodiments are thus able to provide confidence to apply the segmentation policy by leveraging policy simulation and gradual enforcement rollout or deployment across a variety of enforcement technologies.

Advantageously, embodiments are configured to simulate a generic segmentation policy, apply portions of the segmentation policy to enforcement points based on translation or conversion of the segmentation policy for each enforcement points to allow for non-disruptive implementation of the segmentation policy on a network. Embodiments are thus able to reduce the total cost of ownership (TCO) and disruptions due the leveraging existing segmentation solutions on the network, avoiding massive hardware and software refreshes, and network re-architecture while reducing the required human resources involved with operating numerous segmentation policies across multiple technologies. That is, embodiments enable better use of enforcement points and reduction in the number of people who have to manage different simulation products. Users are thus able to use what they currently have and leverage it more consistently. This allows avoiding buying new technologies from a vendor for the purpose of trying to keep pace with segmentation trends.

Embodiments further enable continuous and automatically adaptive segmentation policy changes as a network changes, including automatic segmentation configuration of new segmentation devices (e.g., firewall) upon addition to the network (e.g., upon being detected as communicatively coupled to the network), or the case of replacement. For example, if a firewall device fails, it may be replaced with a new firewall which then configured by embodiments to implement the segmentation policy. In some cases, minimal configuration of the firewall may be necessary to allow communication with embodiments to enable the configured of the segmentation policy.

Embodiments are adaptive to changes including business changes (e.g., new devices added to the network) or risk changes (e.g., new threats that can be restricted through segmentation). This avoids the need to manually adopt a segmentation policy because an automatic and adaptive segmentation policy implementation is supported. The segmentation policy can implemented on enforcement points as a continuous and automatic adaptive segmentation policy.

Embodiments may have functionality for dynamic tagging of entities based on characteristics of each entity (e.g., tagging independent of the IP address associated with an entity or device). For example, the tagging may be performed based on an identification, classification, categorization (e.g., type of user or type of service), source and destination connections, or a combination thereof. The tagging may be dynamically determined in an agentless manner and multiple tags may be assigned to an entity. The tags maybe assigned as described in U.S. Ser. No. 16/023,284, entitled "Dynamic Segmentation Management" by Fainberg, et al. and filed on Jun. 29, 2018, which is herein incorporated by reference. Embodiments may also support manually tagged entities or devices.

For example, embodiments simplify segmentation management in environments with IoT devices which allows for an efficient solution for containing the threat that IoT devices present and reduces that attack surface around it. The lack of the possibility of deploying an agent on most IoT devices makes segmentation the choice to proactively contain IoT based threats in a specific environment so the risk does not spread further on the network. Further, embodiments provide an efficient way to mitigate ransomware attacks, which are becoming more prevalent.

Accordingly, described herein in various implementations are systems, methods, techniques, and related technologies, which may perform segmentation policy management. As described herein, various techniques can be used to manage, simulate, and configure (e.g., using translation, as described herein) one or more segmentation policies based on various entity characteristics.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may use tags assigned to entities or devices based on classification, identification, characteristics, etc. The tags maybe assigned as described in U.S. patent application Ser. No. 16/023,284, and entitled "DYNAMIC SEGMENTATION MANAGEMENT," with filing date Jun. 29, 2018, and is hereby incorporated by reference in its entirety.

Network monitor device 102 may be operable for a variety of tasks including segmentation management including translation of a segmentation policy for implementation on one or more enforcement points. Network monitor device 102 determines and implements the segmentation of the network (e.g., based on assigning one or more tags to each entity) based on the segmentation policy and by configuring one or more enforcement points (e.g., network device 104, firewalls 202-206, etc.) by using commands specific to the one or more enforcement points (e.g., using application programming interface (APIs), command line interface (CLI) commands, etc.).

Network monitor device 102 is configured to store network traffic (e.g., received from network device 104, firewalls 202-206, etc.) which may then be used to determine and simulate segmentation rules (e.g., including segmentation rules that are not yet implemented or configured on the network, for instance, on the enforcement points). Based on the network traffic, network monitor device 102 may determine a segmentation policy (e.g., based on analysis of the traffic and mapping the source and destinations of the network traffic).

In some embodiments, network monitor 102 accesses configuration information from one or more enforcement points (e.g., network device 104, firewalls 202-206, switch 210, etc.) and translates the configuration information into a portion of a segmentation policy. The segmentation policy may further be determined based on one or more portions of a segmentation policy determined based on the configuration information received from one or more enforcement points.

Network monitor device 102 may then provide an interface for viewing, monitoring, simulating, modifying, and implementing the segmentation policy. In some embodiments, network monitor device 102 is operable to perform visualization (e.g., including matrixes and hierarchies) and aggregation of traffic overtime of traffic flows to and from devices, users, services, etc., in different parts of one or more networks (e.g., across the extended enterprise) based on grouping. The visualization and interfaces for managing the segmentation policy may be as described in U.S. patent application Ser. No. 16/023,284, and entitled "DYNAMIC SEGMENTATION MANAGEMENT," with filing date Jun. 29, 2018, and is hereby incorporated by reference in its entirety. Network monitor device 102 may further monitor network traffic over a period of time (e.g., user configurable) based on the segmentation policy and report violations of the segmentation policy, as described herein.

Network monitor device 102 may visualize the segmentation policy with any associated violations. A user may respond by modifying the segmentation policy, as described herein (e.g., to whitelist or blacklist traffic). Network monitor device 102 may then receive or access an input or request from a user to implement the segmentation policy. In some embodiments, network monitor device 102 may automatically implement the segmentation policy. Network monitor device 102 is configured to translate the segmentation policy into configuration information (e.g., commands, settings, etc.) for the enforcement points of the network (e.g., network device 104, firewalls 202-206, switch 210, etc.) and then communicate the configuration information to the enforcement points, as described herein.

Embodiments may detect when segmentation rules are not implemented as a user intended. For example, if a segmentation rule says that research and development (R&D) devices can communicate with printers on port 80 and the rule is simulated, if network traffic is found to include network traffic of R&D devices communicating with printer on port 90, this can be indicated as a violation because the rule only allows for R&D devices to communicate with the printers on port 80. This can be visualized as a violation in the matrix (e.g., with a visual indicator). A user may then decide how to deal with the violation. The violation can then be selected and the rule modified (e.g., to whitelist the observed network traffic) or the violation cleared (e.g., marked as reviewed). In some embodiments, the segmentation rules may automatically be modified to remove any violations thereby configuring the segmentation rules based on network traffic.

Embodiments may also report violations or attempted communications based on simulated rule(s) and actual network traffic over time. For example, if network traffic was observed for a period of a week and R&D devices were observed communicating with printers on port 80, the simulated rules would be marked without a violation. However, as more traffic was monitored over time, the network traffic may include R&D devices communicating with printers on port 90 legitimately which would be identified and visually depicted as a violation of the rule. This communication can be whitelisted and the segmentation rule(s) be updated.

Embodiments are able to help a user understand the impact if one or more segmentation rules that are being simulated were implemented. Referring to the above example, the simulation of the segmentation rule that R&D communication with printers is allowed on port 80 but no other ports and the corresponding indicated violation means that implementing the rule could be disruptive to R&D devices (and users) because the communications with printers on port 90 would be blocked. Embodiments thus enable a cautious approach to implementation of segmentation rules to allow for minimal disruption of network communication, while still granularly tailoring a secure segmentation policy. Embodiments support selection of a single segmentation rule or multiple segmentation rules among many segmentation rules for simulation, implementation, or combination thereof.

Embodiments thus support putting a whole segmentation policy into simulation and monitoring for and indicating any violations of the segmentation policy. This allows review of the segmentation rules on a rule by rule basis to see if there are any violations and whether or not the rule should be modified to allow the traffic that was observed.

Segmentation rules can be selected from the simulation or monitor mode for implementation on one or more enforcement points (e.g., by network monitor device 102 configuring the one or more enforcement points) thereby enabling transition from testing or simulation to implementation. Embodiments support both simulation and implementation of segmentation policies and rules across multiple enforcement points types (e.g., vendors, technologies, device types, etc.). For example, the details of whether a firewall, router, or switch is used (and the associated specific commands) to implement a segmentation policy can be hidden from a user. The enforcement points may be configured using an application programming interface (API), command line interface (CLI), a simple network management protocol (SNMP) interface, or a combination thereof. In some embodiments, the segmentation management is performed without an agent installed on the entity or device.

Network monitor device 102 may further perform a variety of functions including identification, classification, and taking one or more remediation actions (e.g., changing network access of the entity, change the virtual local area network (VLAN), send an email, short message service (SMS), etc.). Entity identification, classification, or combination thereof may be used to determine one or more tags to be associated with the entity which in turn are used to facilitate segmentation visualization, configuration including translation, and simulation, as described herein.

An enforcement point may be a router, firewall, switch, hypervisor, software-defined networking (SDN) controller, virtual firewall, or other network device or infrastructure that may have an ACL like policy to apply based on the IP of an entity. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Three different enforcement actions (e.g., a router ACL, a NGFW ACL, and a cloud infrastructure security group packet filtering ACL) can thus be applied to three different enforcement points (e.g., a router, a NGFW, and cloud infrastructure). Enforcement actions can be applied in each tier (e.g., campus enforcement points, data center enforcement points, cloud enforcement points) across different network tiers.

In some embodiments, if the categorization functionality is being updated (e.g., which could result in a change in one or more tags that are assigned to an entity and thus impact the enforcement of segmentation by the enforcement points), notifications may be sent (e.g., via email or other methods as described herein) or presented to a user (e.g., via a graphical user interface (GUI)) to indicate that the categorization of one or more entities is changing and should be confirmed before enforcement points are updated based on the changed categorization. After conformation, the tags may be changed. The notifications may also be displayed in a GUI including the matrixes or hierarchies, as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, or web interface), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3rd party systems (e.g., system 150) may further be used for determining one or more tags for an entity. For example, a vulnerability assessment (VA) system may be queried to verify or check if an entity is in compliance and provide that information to network monitor device 102. External or 3rd party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
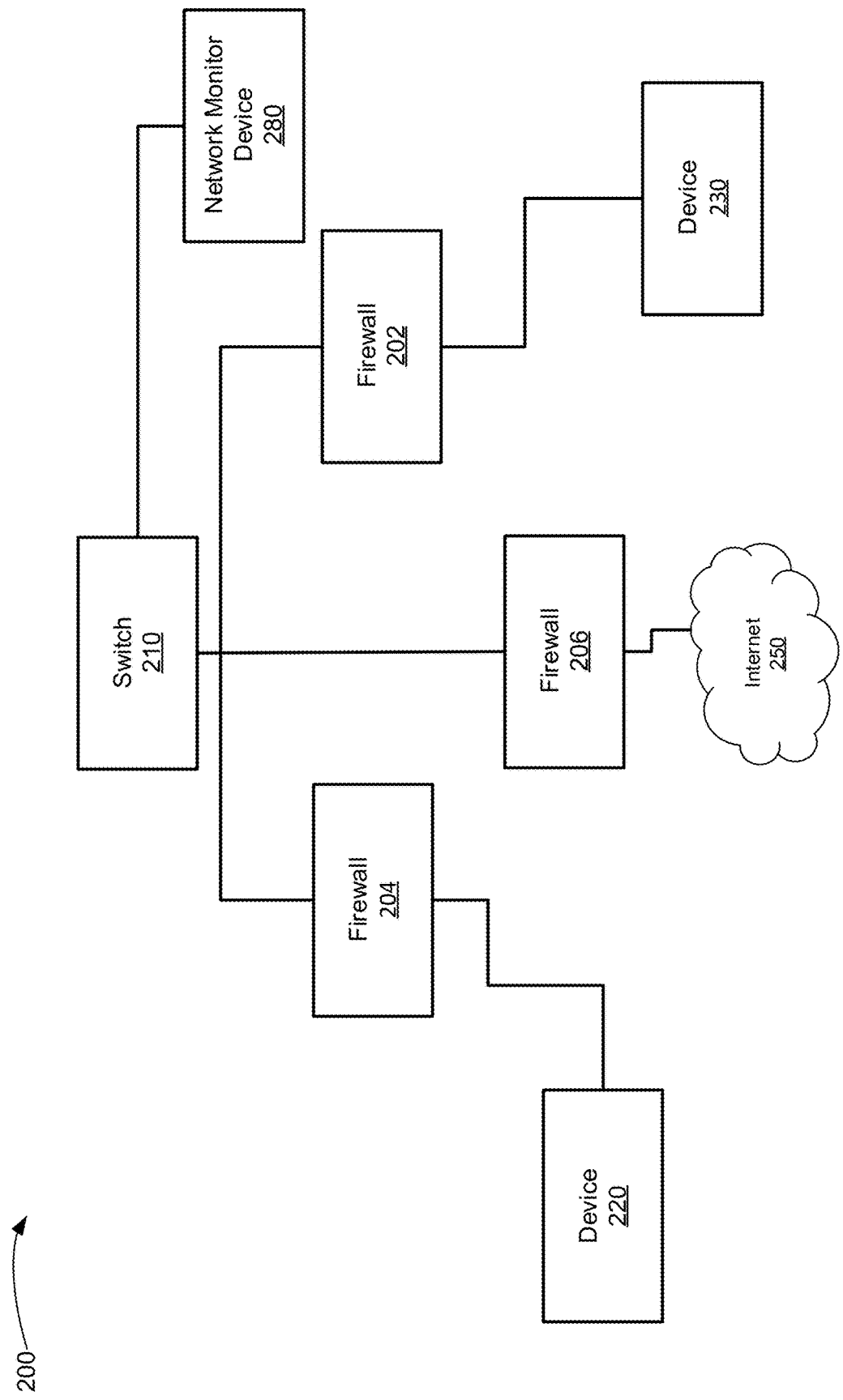
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switch 210) and a network monitor device 280 (e.g., network monitor device 102) which may handle segmentation management, assign one or more tags based on one or more characteristics of an entity, and assign enforcement actions to the enforcement points to implement a segmentation policy. Network monitor device 280 is further configured for visualizing one or more segmentation policies to enable configuration and simulation of the one or more segmentation policies, as described herein.

FIG. 2 shows example network devices 202-230 (e.g., devices 106, 122a-b, 120, and 130) and it is appreciated that more or fewer network devices or other entities may be used in place of network devices of FIG. 2. For example, firewalls 202-206 may be any entity (e.g., network device 104, cloud infrastructure, etc.) that is operable to allow traffic to pass, drop packets or restrict traffic. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. Embodiments support IPv4, IPv6, and other addressing schemes. In some embodiments, network monitor device 280 may be communicatively coupled with firewalls 202-206 and switch 210 through additional individual connections (not shown) (e.g., to receive or monitor network traffic through firewalls 202-206).

Switch 210 communicatively couples the devices of network 200 including firewalls 202-206 and network monitor device 280. Firewalls 202-206 may perform network address translation (NAT) and firewalls 202-204 communicatively couple the devices 220-230 which are behind the firewalls. Firewall 206 communicatively couples network 200 to Internet 250 and firewall 206 may restrict or allow access to Internet 250 based on particular rules or ACLs configured on firewall 206. Firewalls 202-206 are thus enforcement points, as described herein.

Network monitor device 280 is configured to identify, classification, determine characteristics of entities (e.g., devices 220-230), or a combination thereof on network 200, as described herein. Network monitor device 280 is configured to determine one or more tags based the characteristics of devices 220-230, as described herein. The tags can include a compliance tag (e.g., whether the entity is in compliance with a policy), a firewall tag (e.g., which resources or areas the entity is permitted to communicate with based on a firewall), a location tag (e.g., the location, for instance fifth floor, or the department, for instance, accounting department), an access control list (ACL) tag (e.g., which resources or areas the entity is permitted to communicate with), a department tag, a user tag (e.g., which user is logged into the entity), or an account tag (e.g., which account(s) are associated with the entity).

Based on the tags, network monitor device 280 is operable to determine a zone based on the tags determined for an entity. For example, if device 230 has an accounting department tag, a California office tag, a second floor tag, a wireless tag, a lab environment tag, the zone may be a wireless California office lab zone.

Based on the zone, network monitor device 280 is operable to determine enforcement points associated with the determined zone. For example, if device 230 is an accounting department device, switch 201 and firewalls 206 and 202 may be determined to be enforcement points associated with the zone determined for device 220.

Network monitor device 280 may further configure enforcement actions on firewalls 204-206 based on the scan of devices of network 200, as described herein. Network monitor device 280, based on the enforcement points, can assign enforcement actions to enforcement points. Referring to the example above, a NGFW configuration action may be assigned to firewall 206 to allow device 230 to access the internet using HTTP ports only. Firewall 202 and switch 210 may be assigned enforcement actions (e.g., ACLs) to allow device 230 to access other accounting resources (e.g., file shares, email servers, application servers, etc.).

Network monitor device 280 can access network traffic from network 200 (e.g., via switch 210 and firewalls 204-206) and may determine enforcement points of network 200 (e.g., switch 210 and firewalls 204-206). Network monitor device 280 may then query each of the enforcement points for the configuration information including segmentation rules or policies. Network monitor device 280 may then translate that the configuration information into one or more portions (e.g., one or more segmentation rules) of the segmentation policy. Network monitor device 280 further can determine a segmentation policy based on analysis of network traffic (e.g., based on a source and destination connections mapping), as described herein. The segmentation policy based on the network traffic can then be combined with one or more portions of the segmentation policy based on configuration information from the enforcement points. The segmentation policy may further be based on a template or other resources.

Network monitor device 280 may visually or displayed present the segmentation policy. In some embodiments, network monitor device 280 may automatically begin simulating the segmentation policy against current network traffic after determination of the segmentation policy. Network monitor device 280 may indicate segmentation policy violations and other variations (e.g., anomalous traffic as compared to the baseline) in network traffic as compared with segmentation policy, as described herein. A user may then choose to modify the segmentation policy which may then be simulated by network monitor device 280 (e.g., to indicate any violations). The user may then choose to have network monitor device 280 implement one or more portions of the segmentation policy (e.g., to cautiously implement the segmentation policy to avoid communication disruption). In some embodiments, network monitor device 280 is configured to automatically implement the segmentation policy or a portion thereof across multiple enforcement points in response to an implementation command. As part of the implementation, network monitor device 280 is configured to translate the segmentation policy into specific configuration information for switch 210 and firewalls 202-206 and communicate the specific configuration information for switch 210 and firewalls 202-206, as described herein.

For example, if device 220 is an IoT device and device 230 is an accounting file server, network monitor device 280 may analyze traffic between device 220 and device 230 and classify device 220 and device 230 accordingly. In some embodiments, network monitor device 280 may further access configuration information from firewalls 202-204 and translate the configuration information into a portions of a segmentation policy. Firewall 202 may not be configured to block IoT devices from accessing device 230 and firewall 204 may not be configured to block IoT devices from communicating with firewall 202. Based on the network traffic and the configuration information from firewalls 202-204, network monitor device 280 may determine a generic segmentation policy. The segmentation policy may include a restriction on IoT devices (e.g., device 220) from accessing accounting resources (e.g., device 230) based on no traffic being collected between IoT devices and accounting device or a generic rule that IoT devices are segmented from non-IT departments. The segmentation policy may then be presented to a user and a simulation based on network traffic (e.g., past, current, or future network traffic) may be performed by network monitor device 280. Network monitor device 280 may indicate a violation of the segmentation policy if IoT device 220 communicates or attempts to communicate with accounting file server device 230. A user may then respond to this by indicating that such network traffic between devices 220 and device 230 should be blocked. Network monitor device 280 can then translate the generic segmentation policy into customized configuration information that is sent to firewalls 202-204 thereby causing them to be configured to prevent communication from device 220 to device 230. Network monitor device 280 may further configure firewall 206 and switch 210 to prevent communication of IoT devices with accounting devices and Internet 250. Network monitor device 280 further supports blocking user, services, etc., from accessing portions of a network.

Figure 3:
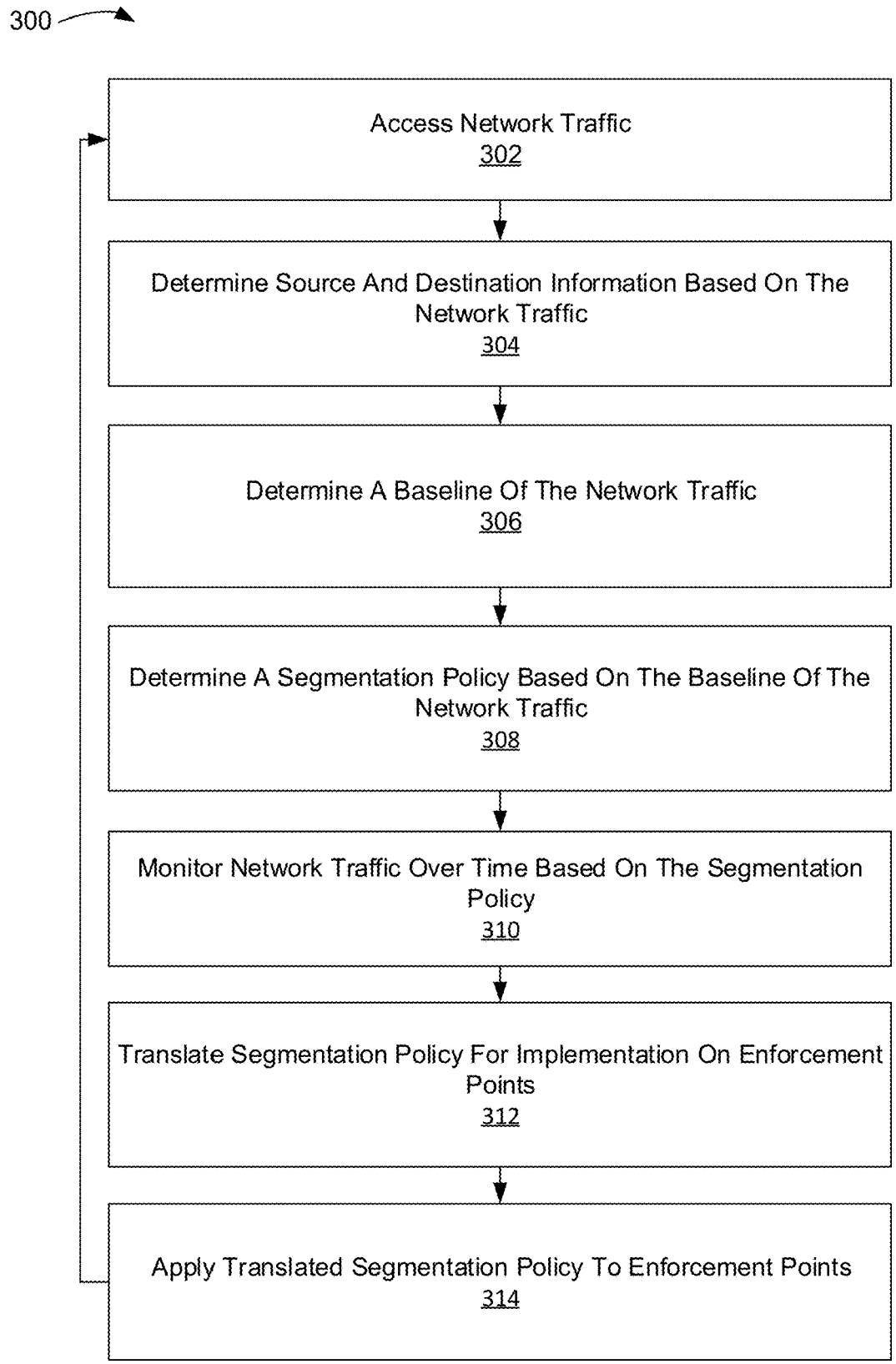
FIG. 3 depicts a flow diagram of aspects of a method for segmentation management including translation in accordance with one implementation of the present disclosure.
Figure 4:
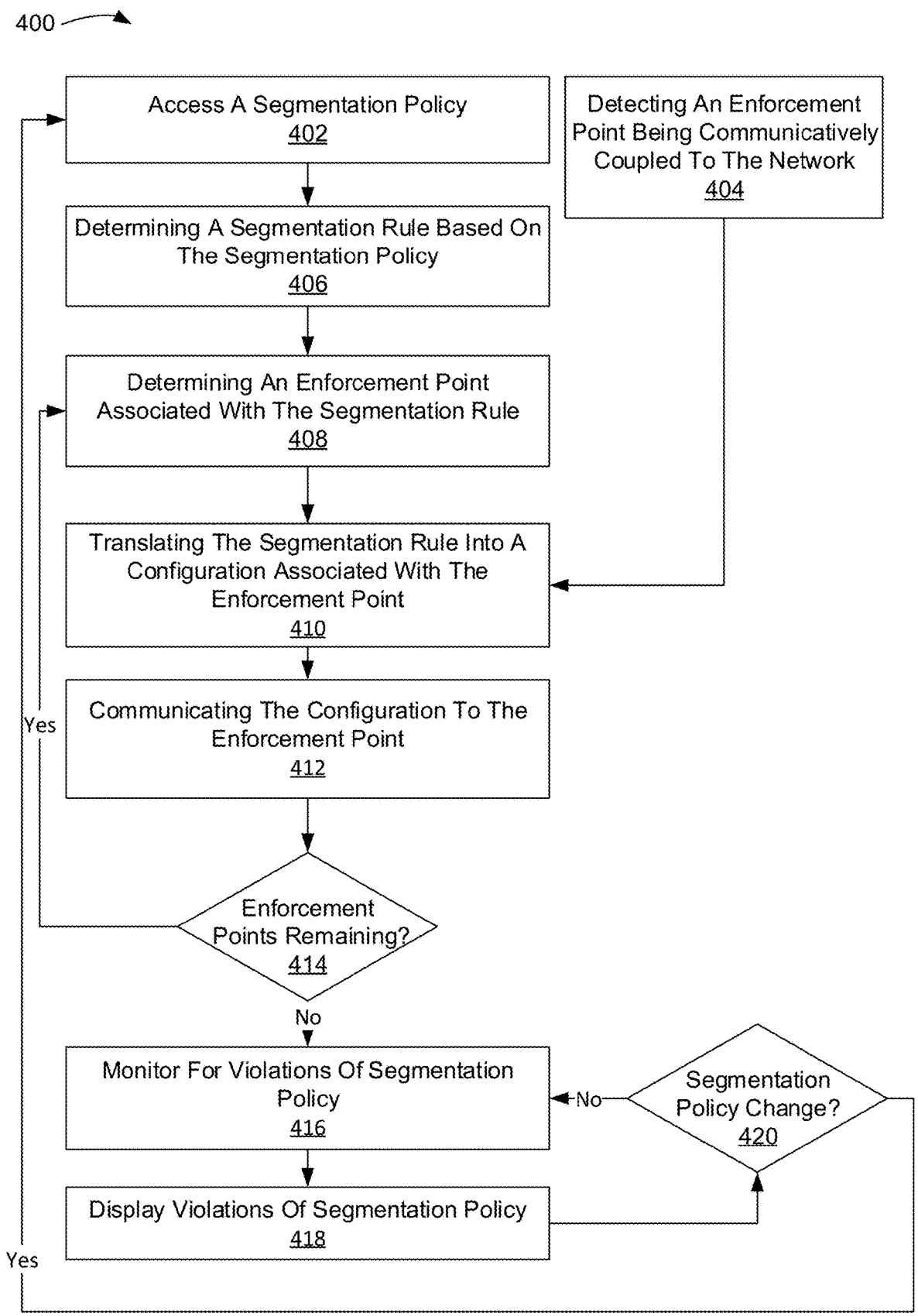
FIG. 4 depicts a flow diagram of aspects of a method for configuring one or more enforcement points in accordance with one implementation of the present disclosure.
Figure 5:
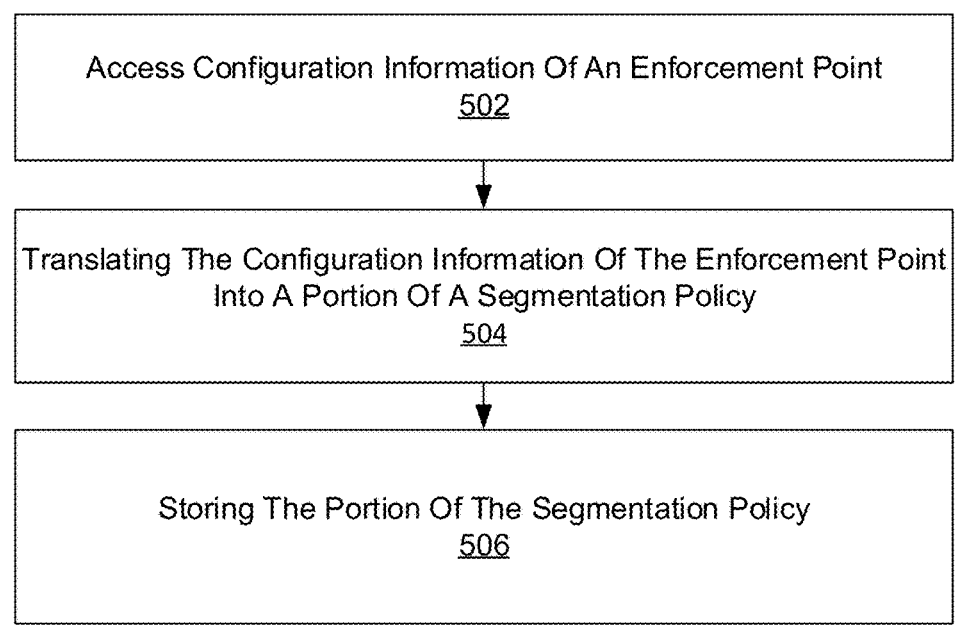
FIG. 5 depicts a flow diagram of aspects of a method for accessing configuration information of one or more enforcement points in accordance with one implementation of the present disclosure.

With reference to FIGS. 3-5, flowcharts 300-500 illustrate example functions used by various embodiments. Although specific function blocks ("blocks") are disclosed in flowcharts 300-500, such blocks are examples. That is, embodiments are well suited to performing various other blocks or variations of the blocks recited in flowcharts 300-500. It is appreciated that the blocks in flowcharts 300-500 may be performed in an order different than presented, and that not all of the blocks in flowcharts 300-500 may be performed.

FIG. 3 depicts a flow diagram of aspects of a method for segmentation management including translation in accordance with one implementation of the present disclosure. Various portions of flowchart 300 may be performed by different components (e.g., components of system 600) of an entity (e.g., network monitor device 102 or network monitor device 280). Flowchart 300 depicts a process for analyzing traffic and configuring a segmentation policy.

At block 302, network traffic is accessed. The network traffic may be accessed and stored by a device (e.g., network monitor 102 or network monitor device 280) based on receiving traffic from one or more network devices (e.g., network device 104, firewalls 202-206, switch 210, etc.). The traffic may be gathered from anywhere on the network across an extended enterprise and can be based on various types of flow (e.g., Netflow originally from Cisco Systems of San Jose, Calif., s-Flow, Jflow, Netstream, Cflow, Rflow, flowlogs from a cloud, etc.). This traffic may be stored for use in simulating network segmentation rules to determine which, if any, proposed or tested segmentation rules are not currently being enforced (e.g., violated or would block existing traffic) or to determine if communication is inappropriately being blocked.

At block 304, source and destination information is determined based on the network traffic. In some embodiments, the network traffic is assigned to relevant sources and destination entities on the network. This gives the network traffic context of source and destination for each entity. This context may then be combined with other characteristics of each entity (e.g., classification, identification, user role, compliance, risk, location, etc.), thereby categorizing portions of the traffic in relation to entities and entity groups.

At block 306, a baseline of network traffic is determined. The baseline may be determined based on the source and destination information determined based on the network traffic. The baseline of network traffic is the network traffic analyzed prior to the creation of a segmentation policy. The baseline of network traffic may be treated as normal network traffic but then analyzed as the segmentation policy is constructed to allow detection of anomalous behavior. The baseline of network traffic may include information that the two groups of entities regularly communicate and the ports they use to communicate. The baseline of the network may thus be used in understanding or gaining insights into the traffic on the network.

At block 308, a segmentation policy based on the baseline of the network traffic is determined. The segmentation may be automatically generated based on baseline of the network traffic (e.g., rules for allowing observed traffic and denying communication for other communications), generated manually, or a combination thereof. The segmentation policy may further be based on a segmentation policy template (e.g., an IoT segmentation policy template).

At block 310, network traffic based on the segmentation policy is monitored over time. The network traffic observed after the segmentation policy has been created may be observed for violations (e.g., network traffic that would be blocked by a segmentation rule). The violations may be displayed and then responded to by a user (e.g., whitelisting the traffic, blacklisting the traffic, for instance, implementing the violated segmentation rule to block the traffic, etc.). The monitoring of the segmentation policies overtime can allow customizing the segmentation policy to allow for minimal disruption when implementing the segmentation policy on enforcement points.

At block 312, the segmentation policy is translated for implementation on enforcement points. The segmentation policy may be translated into one or more commands or configuration settings for each particular enforcement point. The translation of the segmentation policy for enforcement points thus translates the policy intent into an actual enforcement paradigm.

At block 314, the translated segmentation policy is applied or communicated to the enforcement points. The results of the translation (e.g., commands or configuration settings) may be communicated to the enforcement points for implementation. The translated segmentation policy may be communicated to the enforcement point using at least one of an application programming interface (API), command line interface (CLI), or a simple network management protocol (SNMP) interface. In some embodiments, the translated segmentation policy is applied to the enforcement points as described with respect to example flowchart 400. For example, the configuration information (e.g., one or more commands or enforcement point policies) sent to an enforcement point may configure the enforcement point to prevent communication beyond an enforcement point, restrict the ports or protocols that may be used, etc.

Block 302 may then be performed as part of a continuous, real-time, or combination thereof monitoring of the network as compared to segmentation policy. Block 302 may also be performed each time an entity communicatively coupled to the network (e.g., new devices and returning devices).

FIG. 4 depicts a flow diagram of aspects of a method for configuring one or more enforcement points in accordance with one implementation of the present disclosure. Various portions of flowchart 400 may be performed by different components (e.g., components of system 600) of an entity (e.g., network monitor device 102 or network monitor device 280). Flowchart 400 depicts a process for implementing a segmentation policy on one or more enforcement points.

At block 402, a segmentation policy is accessed, as described herein. The segmentation policy accessed may be configured based on a baseline of network traffic, user configuration, based on a template file, or a combination thereof, as described herein.

At block 404, an enforcement point being communicatively coupled to the network is detected. The entity (e.g., a firewall, virtual network infrastructure, etc.) may be detected upon being communicatively coupled to the network (e.g., being communicatively coupled to network device 104 or switch 210). The detecting of the entity coupled to the network may include detecting the entity in response to the entity being recoupled or readmitted to the network.

At block 406, a segmentation rule based on the segmentation policy is determined. The segmentation rule may be a portion of the segmentation policy and apply to a particular entity group, environment, etc. Embodiments may determine segmentation rules based on the order of the rules of the segmentation policy.

At block 408, an enforcement point associated with the segmentation rule is determined. The enforcement point may be determined or selected based on the type of enforcement point. For example, a segmentation rule for blocking traffic for virtual machines may be associated with virtual network infrastructure that is determined.

At block 410, the segmentation rule is translated into configuration information associated with the enforcement point. The segmentation rules is translated into configuration information customized for the determined enforcement point. The configuration information may be at least one of an access control list (ACL) rule, a cloud packet filtering ACL, virtual packet filtering ACL, and a tag based action. A tag based action is an action that an enforcement point (e.g., a NGFW) can be configured to perform (e.g., pass, drop, or filter a packet) based on a tag associated with a packet or the entity that sent the packet.

At block 412, the configuration is communicated to the enforcement point. The configuration may be communicated to the enforcement point using at least one of an application programming interface (API), command line interface (CLI), or a simple network management protocol (SNMP) interface, etc., as described herein.

At block 414, whether any enforcement points remain to be configured based on the segmentation policy is determined. The determination may be based on a list of enforcement points determined from the network traffic. If enforcement points remain to be configured based on the segmentation policy, block 408 may be performed. If no enforcement points remain to be configured based on the segmentation policy, block 416 may be performed.

At block 416, violations of the segmentation policy are monitored. In various embodiments, after network traffic has been stored and compared against one or more segmentation rules to determined violations, as described herein. In some embodiments, the violations may be responded to automatically by blocking the entity sending the communication (e.g., changing the VLAN of the entity or quarantining the entity).

At block 418, violations, if any, of the segmentation policy are displayed. The segmentation policy may be displayed along with information of the entity groups, enforcement points, environment, locations, and other characteristics associated with the segmentation violation. A user may then choose to whitelist (e.g., modify the segmentation rule) or blacklist (e.g., implement the segmentation rule to block the traffic) the traffic. In some embodiments, an indicator may be presented indicating that traffic is occurring in violation of the segmentation rules. For example, the indicator may flash on the GUI or be colored red where traffic has violated a simulated segmentation rule, e.g., where a firewall has not been configured to enforce the rule and communication is being allowed in violation of the simulated segmentation rule. This may occur where a segmentation rules is configured on a portion of the enforcement points of a network. In some embodiments, selecting the indicator may show which enforcement point(s) are associated with the violation of the segmentation rule. Embodiments may thus assist in determining whether segmentation rules are being properly enforced by enforcement points and the enforcement is successful.

In some embodiments, the visual indicator of a violation may be selected and a menu presented for invoking a function to whitelist (or allow) or blacklist (or block) the traffic. The whitelisting or blacklisting of the traffic may include modifying the segmentation rules of enforcement points, as described herein. In various embodiments, an option to block the entity from communicating (e.g., with the rest of the network) may be selected and then the entity is isolated (e.g., by changing the VLAN entity or quarantining the entity) thereby allowing analysis of the entity while protecting the network.

At block 420, the whether the segmentation policy has changed is determined. If the segmentation policy has changed, block 402 may be performed. If the segmentation policy has not changed, block 416 may be performed. In some embodiments, block 416 is performed as part of a continuous monitoring of network traffic for segmentation policy violations.

FIG. 5 depicts a flow diagram of aspects of a method for accessing configuration information of one or more enforcement points in accordance with one implementation of the present disclosure. Various portions of flowchart 500 may be performed by different components (e.g., components of system 600) of an entity (e.g., network monitor device 102 or network monitor device 280). Flowchart 500 depicts a process for accessing configuration information from an enforcement point. The configuration information access from one or more enforcement points may then the added to a segmentation policy configuration which may then be modified or configured, as described herein, and then the segmentation policy applied to the one or more enforcements (e.g., as described to with respect to FIG. 3-4).

At block 502, configuration information of an enforcement point is accessed. The configuration information of the enforcement point may be accessed using at least one of an application programming interface (API), command line interface (CLI), or a simple network management protocol (SNMP) interface. The configuration information may include at least one of an access control list (ACL) rule, a cloud packet filtering ACL, virtual packet filtering ACL, and a tag based action.

At block 504, the configuration information of the enforcement point is translated into a portion of a segmentation policy (e.g., a generic segmentation policy that can be used for monitoring network traffic for violations, as described herein). For example, the configuration information of a firewall may be translated into a generic segmentation policy that is firewall and vendor independent which may then be modified, as described herein.

At block 506, the portion of the segmentation policy is stored. The portion of the segmentation policy may be stored with other portions from other enforcement points thereby enabling embodiments to display and allow changes to a segmentation policy based on the current configurations of enforcement points on the network.

Figure 6:
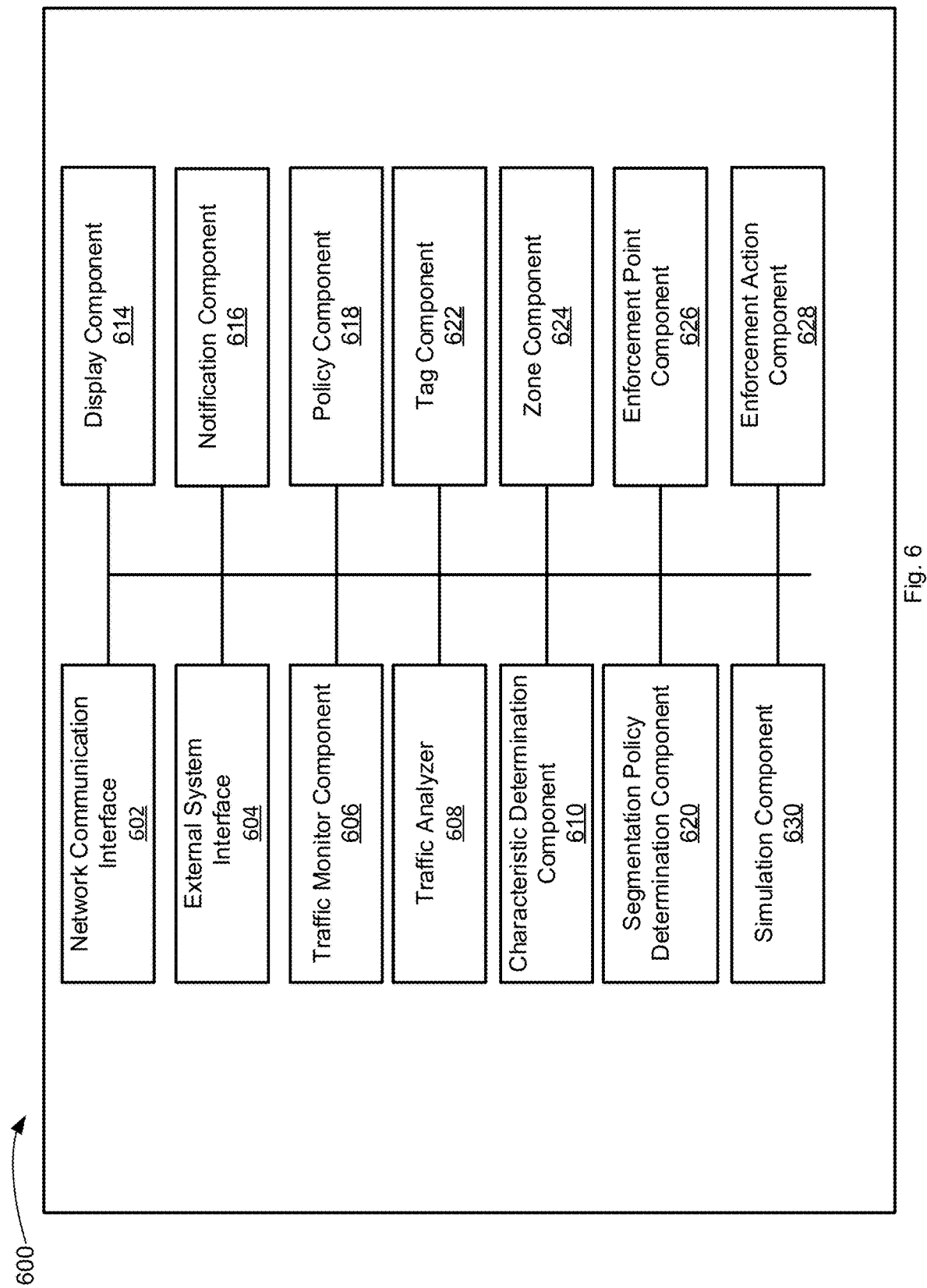
FIG. 6 depicts illustrative components of a system for segmentation management including translation in accordance with one implementation of the present disclosure.

FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for segmentation management including translation in accordance with one implementation of the present disclosure. Example system 600 includes a network communication interface 602, an external system interface 604, a traffic monitor component 606, a traffic analyzer 608, characteristic determination component 610, a characteristic determination component 610, a display component 614, a notification component 616, a policy component 618, segmentation policy determination component 620, tag component 622, zone component 624, enforcement point component 626, enforcement action component 628, and simulation component 630. The components of system 600 may be part of a computing system or other electronic device (e.g., network monitor device 102 or network monitor device 280) or a virtual machine and be operable to monitor and one or more entities communicatively coupled to a network, monitor network traffic, and manage segmentation policies and rules on one or more enforcement points, as described herein. For example, the system 600 may further include a memory and a processing device, operatively coupled to the memory, which may perform the functions of or execute the components of system 600. The components of system 600 may access various data and characteristics associated with an entity (e.g., network communication information) and data associated with one or more entities. It is appreciated that the modular nature of system 600 may allow the components to be independent and allow flexibility to enable or disable individual components or to extend/upgrade components without affecting other components thereby providing scalability and extensibility. System 600 may perform one or more blocks of flow diagram 300.

Communication interface 602 is operable to communicate with one or more entities (e.g., network device 104, firewalls 202-206, switch 210, etc.) coupled to a network that are coupled to system 600 and receive or access information about entities (e.g., entity communications, entity characteristics, etc.) and segmentation policies and rules (e.g., from one or more enforcement points), as described herein. The communication interface 602 may be operable to work with one or more components to initiate access to characteristics about an entity to allow determination of one or more tags and assigning actions based on the tags or one or more enforcement points, as described herein. Communication interface 602 may be used to receive and store network traffic for segmentation policy management and simulation, as described herein.

External system interface 604 is operable to communicate with one or more third party, remote, or external systems to access information including characteristics about an entity. External system interface 604 may further store the accessed information in a data store. For example, external system interface 604 may access information from a vulnerability assessment (VA) system to enable determination of one or more compliance tags to be associated with the entity. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall for information (e.g., network session information) about an entity or for a list of entities that are communicatively coupled to the firewall and communications associated therewith. In some embodiments, external system interface 604 may query a firewall or other system for information of communications associated with an entity.

Traffic monitor component 606 is operable to monitor network traffic to determine if a new entity has joined the network or an entity has rejoined the network and monitor traffic for analysis by traffic analyzer 608, as described herein. Traffic monitor component 606 is further operable to store network traffic (e.g., from network devices and enforcement points, for instance, network device 104, firewalls 202-206, and switch 210) for use by other components for simulation of segmentation rules, facilitating configuration of segmentation rules, or a combination thereof, as described herein.

Traffic analyzer 608 is configured to perform analysis of network traffic (e.g., in real-time, with machine learning, etc.) to and from an entity thereby providing analysis of end to end communications of an entity (e.g., including determining a connection map), as described herein. Traffic analyzer 608 may further be able to determine enforcement points, as described herein. Traffic analyzer 608 may have a packet engine operable to access packets of network traffic (e.g., passively) and analyze the network traffic. The traffic analyzer 608 may be configured to perform active or passive traffic analysis or a combination thereof. The traffic analyzer 608 may further be able to access and analyze traffic logs from one or more entities (e.g., network device 104, system 150, or aggregation device 106) or from an entity being monitored. The traffic analyzer 608 may further be able to access traffic analysis data associated with an entity being monitored, e.g., where the traffic analysis is performed by a third party system. Information of traffic analyzer 608 may be stored, displayed, and used as a basis for segmentation rule configuration, validation, or simulation, as described herein.

Characteristic determination component 610 is configured to determine one or more characteristics of an entity, as described herein. The entity characteristics can then be stored and used by other components for performing segmentation management including visualization, configuration, simulation, or a combination thereof.

Segmentation determination policy component 620 is configured to determine or select a segmentation policy based on the one or more characteristics of one or more entities of a group and network traffic, as described herein. Segmentation determination policy component 620 may be further configured to determine subgroups of entity groups based on characteristics and determine segmentation rules associated with the groups (and entities/subgroups), as described herein. Segmentation determination policy component 620 may be configured for accessing configuration information including segmentation policies or rules from one or more enforcement points, as described herein. Segmentation determination policy component 620 may be further configured to translate enforcement point configuration information into a portion of the segmentation policy (e.g., a generic segmentation policy independent of enforcement point technology) to include the current configuration of the enforcement points on a network, as described herein. The segmentation policy may further be determined based on a template or other file, as described herein.

Display component 614 is configured to optionally display one or more graphical user interfaces or other interfaces (e.g., command line interface) for depicting various information associated with entities and segmentation including one or more matrixes and hierarchies, as described herein. In some embodiments, display component 614 may display or render a network graph of entities, tags associated with entities, and other segmentation information (e.g., service associated entity group information).

Notification component 616 is operable to initiate one or more notifications based on the results of monitoring communications or characteristics of one or more entities and segmentation rules (e.g., alerting of segmentation rule violation), as described herein. The notification may be any of a variety of notifications, e.g., IT ticket, email, SMS, a HTTP notification, etc., as described herein.

Policy component 618 is operable for initiating or triggering one or more remediation actions or security actions according to one or more policies, e.g., based on a segmentation rule violation, as described herein. Policy component 618 may further be configured to perform other functions including checking compliance status, finding open ports, etc. Policy component 618 may restrict network access, signal a patch system or service, signal an update system or service, etc., as described herein. The policy component 618 may thus, among other things, invoke automatically patching, automatically updating, and automatically restrict network access of an entity (e.g., that has out-of-date software or based on segmentation violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Tag component 622 is configured to determine one or more tags to be assigned to an entity based on one or more characteristics of the entity and assign the one or more tags to the entity, as described herein. Zone component 624 is configured to determine a zone based on the one or more tags assigned to an entity, as described herein.

Enforcement point component 626 is configured to determine one or more enforcement points (e.g., network devices) associated with the zone for the entity or within one or more networks, as described herein. In some embodiments, enforcement point component 626 is further configured to access or request configuration information from enforcement points which may then be used to determine a segmentation policy, as described herein.

Enforcement action component 628 is configured to assign one or more enforcement actions to the one or more enforcement points based on the zone associated with the entity, as described herein. Enforcement action component 628 is further configured to translate a generic segmentation policy into configuration information (e.g., customized information) for one or more enforcement points of a network. Enforcement action component 628 is further configured to apply or communicate the configuration information to the enforcement points, as described herein. In some embodiments, enforcement action component 628 may act as a controller of the enforcement points of a network (e.g., a software defined controller).

Simulation component 630 is configured to simulate one or more segmentation polices based on network traffic, as described herein. Simulation component 630 may also determine if one or more proposed segmentation rules have been violated or if there is anomalous activity on the network (e.g., as compared to baseline network traffic), as described herein.

The system 600 may be software stored on a non-transitory computer readable medium having instructions encoded thereon that, when executed by a processing device, cause the processing device to access a segmentation policy and determine, using the processing device, a segmentation rule based on the segmentation policy. The instructions may further cause the processing device to determine an enforcement point associated with the segmentation rule, where the enforcement point is communicatively coupled to a network, and translate the segmentation rule into a configuration associated with the enforcement point. The instructions may further cause the processing device to communicate the configuration to the enforcement point.

In some embodiments, the instructions may further cause the processing device to store network traffic, where the network traffic comprises a plurality of communications between a plurality of devices, and determine respective source and respective destinations of the communications of the network traffic. The instructions may further cause the processing device to determine the segmentation policy based the respective source and respective destinations of the communications and monitoring additional network traffic based on the segmentation policy. In various embodiments, the instructions may further cause the processing device to determining a baseline of the network traffic over a period of time.

In some embodiments, the instructions may further cause the processing device to detect an enforcement point being communicatively coupled to a network. In various embodiments the configuration associated with the enforcement point comprises at least one of an access control list (ACL), a firewall command, or rule or a cloud packet filtering ACL. In some embodiments, the communicating the configuration to the enforcement point comprises using at least one of an application programming interface (API), command line interface (CLI), or a simple network management protocol (SNMP) interface.

In various embodiments, the enforcement point is at least one of a firewall, a router, a switch, a portion of cloud infrastructure, hypervisor, software-defined networking (SDN) controller, or virtual firewall. In some embodiments, the instructions may further cause the processing device to access configuration information from the enforcement point and translate the configuration information of the enforcement point into a portion of a segmentation policy. The instructions may further cause the processing device to store the portion of the segmentation policy.

In various embodiments, the segmentation rule is based on a characteristic of an entity determined without the use of an agent. In some embodiments, the characteristic of the entity is based on determining at least one of a classification of the entity or an identification of the entity. In various embodiments, the characteristic of the entity is based on a source and a destination of a communication of the entity. In some embodiments, the plurality of entities comprises at least one of a device, an endpoint, a virtual machine, a service, a serverless service, a container, or a user.

Figure 7:
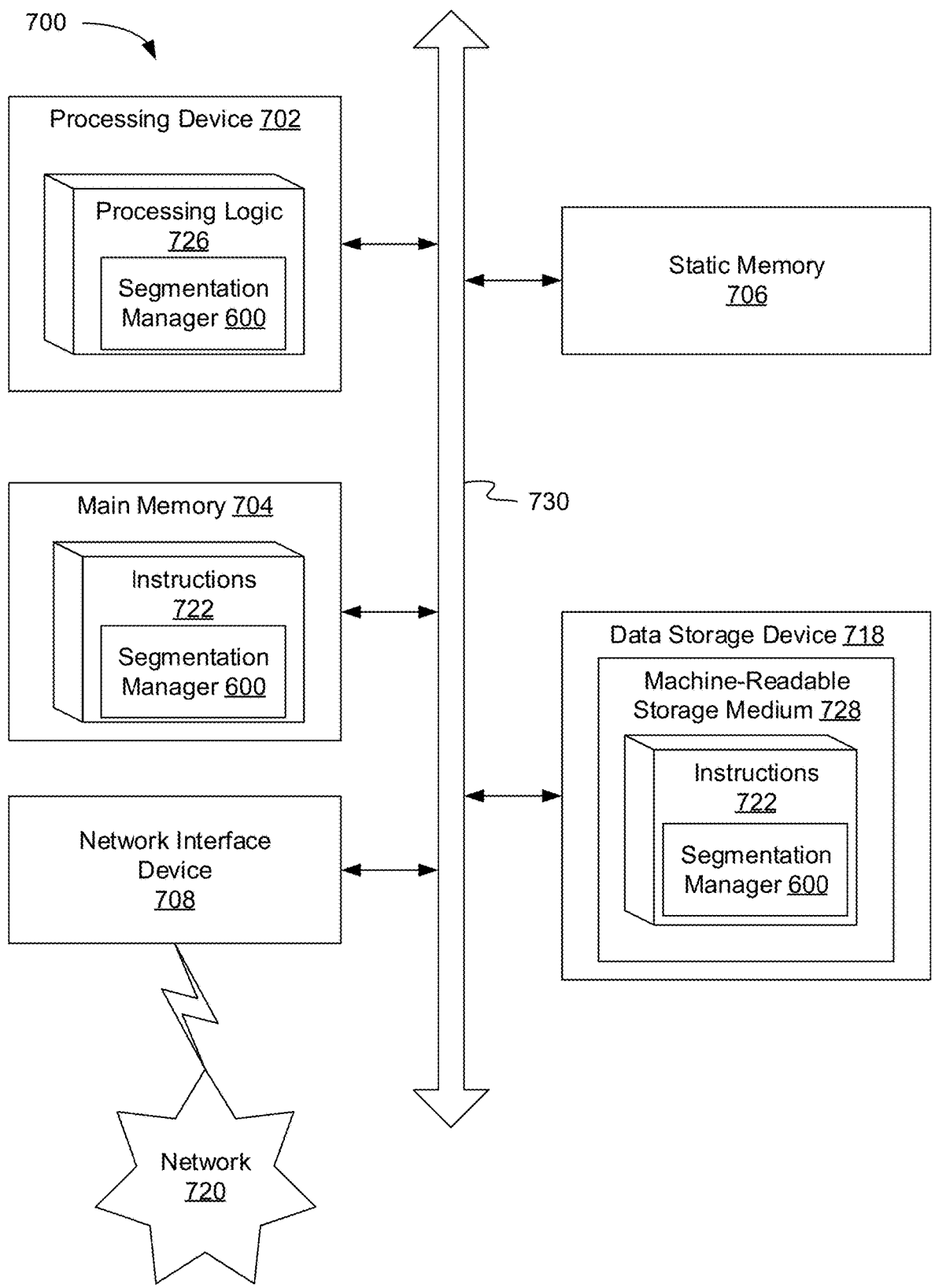
FIG. 7 is a block diagram illustrating an example computer system, in accordance with one implementation of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor device 102 running segmentation manager 600 to perform segmentation management including visualization, configuration including translation, simulation, or a combination thereof, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of segmentation manager 600 shown in FIG. 6, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute segmentation manager 600. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for managing segmentation including visualization, configuration including translation, simulation, or a combination thereof, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

accessing a segmentation policy;

simulating the segmentation policy against actual network traffic of a network to identify a violation of the segmentation policy based on the actual network traffic, wherein simulating the segmentation policy comprises comparing the actual network traffic from operation of the network with simulated network traffic of the network resulting from application of the segmentation policy to the actual network traffic;

updating the segmentation policy, prior to applying the segmentation policy to the network, based on the violation to align the segmentation policy with the actual network traffic;

determining one or more characteristics of an entity of the network based on the actual network traffic without the use of an agent;

tagging the entity with a classification based on the one or more characteristics of the entity;

determining a segmentation rule based on the segmentation policy, wherein the segmentation rule is based on the classification of the entity;

determining an enforcement point associated with the segmentation rule, wherein the enforcement point is communicatively coupled to the network;

translating the segmentation rule into a configuration associated with the enforcement point;
communicating the configuration to the enforcement point; and
monitoring additional network traffic for a violation of the segmentation policy resulting from the configuration at the enforcement point.

2. The method of claim 1 further comprising:
storing the actual network traffic, wherein the actual network traffic comprises a plurality of communications between a plurality of devices;
determining respective source and respective destinations of the communications of the actual network traffic;
determining the segmentation policy based the respective source and respective destinations of the communications; and
monitoring additional network traffic based on the segmentation policy.

3. The method of claim 2, further comprising:
determining a baseline of the actual network traffic over a period of time.

4. The method of claim 2, wherein the plurality of devices comprises at least one of a device, an endpoint, a virtual machine, a service, a serverless service, a container, or a user.

5. The method of claim 1, further comprising:
detecting the enforcement point being communicatively coupled to the network.

6. The method of claim 1, wherein the configuration associated with the enforcement point comprises at least one of an access control list (ACL), a firewall command, or rule or a cloud packet filtering ACL.

7. The method of claim 1, wherein the communicating the configuration to the enforcement point comprises using at least one of an application programming interface (API), command line interface (CLI), or a simple network management protocol (SNMP) interface.

8. The method of claim 1, wherein the enforcement point is at least one of a firewall, a router, a switch, a portion of cloud infrastructure, hypervisor, software-defined networking (SDN) controller, or virtual firewall.

9. The method of claim 1 further comprising:
accessing configuration information from the enforcement point;
translating the configuration information of the enforcement point into a portion of a segmentation policy; and
storing the portion of the segmentation policy.

10. The method of claim 1, wherein the one or more characteristics of the entity comprises an identification of the entity.

11. The method of claim 1, wherein the one or more characteristics of the entity comprises a source and a destination of a communication of the entity.

12. A system comprising:
a memory; and
a processing device, operatively coupled to the memory, to:
access a segmentation policy;
simulate the segmentation policy against network traffic of a network to identify a violation of the segmentation policy based on the network traffic, wherein simulating the segmentation policy comprises comparing actual network traffic from operation of the network with simulated network traffic of the network resulting from application of the segmentation policy to the actual network traffic;
update the segmentation policy, prior to applying the segmentation policy to the network, based on the violation to align the segmentation policy with the actual network traffic;
determine one or more characteristics of an entity of the network based on the actual network traffic without the use of an agent;
tag the entity with a classification based on the one or more characteristics of the entity;
determine a segmentation rule based on the segmentation policy, wherein the segmentation rule is based on the classification of the entity;
determine an enforcement point associated with the segmentation rule, wherein the enforcement point is communicatively coupled to a network;
translate the segmentation rule into a configuration associated with the enforcement point;
communicate the configuration to the enforcement point;
access configuration information of the enforcement point;
translate the configuration information of the enforcement point into a portion of the segmentation policy;
store the portion of the segmentation policy; and
monitor network traffic for a violation of the segmentation policy resulting from the configuration at the enforcement point.

13. The system of claim 12, wherein the processing device further to:
store the actual network traffic, wherein the actual network traffic comprises a plurality of communications between a plurality of devices;
determine respective source and respective destinations of the communications of the actual network traffic;
determine the segmentation policy based the respective source and respective destinations of the communications; and
monitor additional network traffic based on the segmentation policy.

14. The system of claim 12, wherein the configuration associated with the enforcement point comprises at least one of an access control list (ACL), a firewall command, or rule or a cloud packet filtering ACL.

15. A non-transitory computer readable medium having instructions encoded thereon that, when executed by a processing device, cause the processing device to:
access a segmentation policy;
simulate the segmentation policy against actual network traffic of a network to identify a violation of the segmentation policy based on the actual network traffic, wherein simulating the segmentation policy comprises comparing the actual network traffic from operation of the network with simulated network traffic of the network resulting from application of the segmentation policy to the actual network traffic;
update the segmentation policy, prior to applying the segmentation policy to the network, based on the violation to align the segmentation policy with the actual network traffic;
determine one or more characteristics of an entity of the network based on the actual network traffic without the use of an agent;
tag the entity with a classification based on the one or more characteristics of the entity;
determine, using the processing device, a segmentation rule based on the segmentation policy, wherein the segmentation rule is based on the classification of the entity;

determine an enforcement point associated with the segmentation rule, wherein the enforcement point is communicatively coupled to the network;
translate the segmentation rule into a configuration associated with the enforcement point;
communicate the configuration to the enforcement point;
access configuration information of the enforcement point;
translate the configuration information of the enforcement point into a portion of the segmentation policy;
store the portion of the segmentation policy; and
monitor additional network traffic for a violation of the segmentation policy resulting from the configuration at the enforcement point.

16. The non-transitory computer readable medium of claim 15, wherein the instructions further cause the processing device to:
store the actual network traffic, wherein the actual network traffic comprises a plurality of communications between a plurality of devices;
determine respective source and respective destinations of the communications of the actual network traffic;
determine the segmentation policy based the respective source and respective destinations of the communications; and
monitor additional network traffic based on the segmentation policy.

17. The non-transitory computer readable medium of claim 15, wherein the configuration associated with the enforcement point comprises at least one of an access control list (ACL), a firewall command, or rule or a cloud packet filtering ACL.

* * * * *